United States Patent [19]
Masui et al.

[11] Patent Number: 5,954,579
[45] Date of Patent: Sep. 21, 1999

[54] DEVICE FOR AUTOMATICALLY CHANGING AIR DIRECTION

[75] Inventors: Toshihide Masui, Kosai; Toshio Tsuboko, Anjo; Yoshinaka Nakamura, Kariya; Hiroaki Kodama, Chiryu; Fumihisa Ichioka, Obu; Takumi Miyaki, Obu; Ikuma Harada, Obu, all of Japan

[73] Assignees: Denso Corporation of Kariya, Japan; Tokai Riki Mfg. Co. Ltd., Obu, Japan

[21] Appl. No.: 08/929,204

[22] Filed: Sep. 9, 1997

[30] Foreign Application Priority Data

Sep. 13, 1996 [JP] Japan .................................. 8-243817
Sep. 13, 1996 [JP] Japan .................................. 8-243818
Sep. 13, 1996 [JP] Japan .................................. 8-243824

[51] Int. Cl.$^6$ ............................................ B60H 1/34
[52] U.S. Cl. ................................... 454/125; 454/285
[58] Field of Search ........................... 454/125, 202, 454/285

[56] References Cited

U.S. PATENT DOCUMENTS 4,107,559  8/1978  Patel .
4,628,801  12/1986  Hashimoto .............................. 454/285
5,186,387  2/1993  Doi et al. .
5,338,251  8/1994  Matsumoto ........................ 454/285 X
5,660,588  8/1997  Kotoh et al. ............................. 454/285

FOREIGN PATENT DOCUMENTS 30 34 558   3/1981   Germany .
32 21 792  12/1983   Germany .
61-11544    1/1986   Japan .................................... 454/285
2-62-18919  5/1987   Japan .
2-3-47167  10/1991   Japan .
4-136657    5/1992   Japan .
6-305323   11/1994   Japan .
2-7-31081   7/1995   Japan .

Primary Examiner—Harold Joyce
Attorney, Agent, or Firm—Harness, Dickey & Pierce, PLC

[57] ABSTRACT

A female screw portion is formed around an axis of a rotor of a step motor to penetrate through the rotor in an axial direction of the rotor. A male screw portion is formed on an outer peripheral surface of a screw shaft so that the screw shaft is screwed into the female screw portion. The screw shaft is inserted in a ring rod, and a connection clip portion is connected to the ring rod. When the rotor rotates, the ring rod reciprocates linearly in the axial direction of the rotor, and vertical fins rock in the axial direction of the rotor.

28 Claims, 8 Drawing Sheets

FIG. I

FIG. 10A   FIG. 10B   FIG. 10C
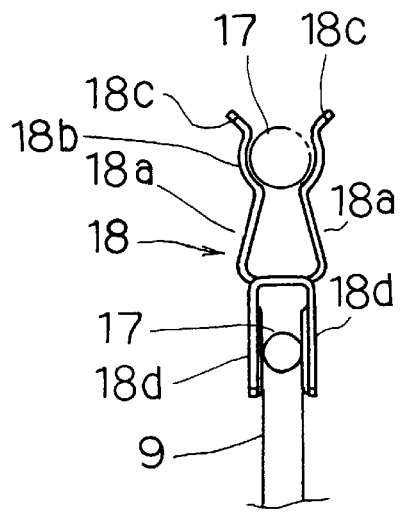 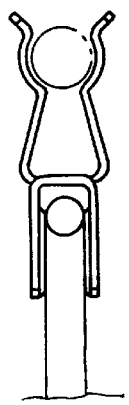 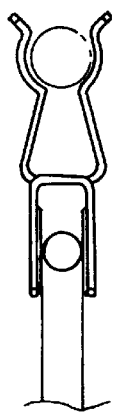
FIG. 11
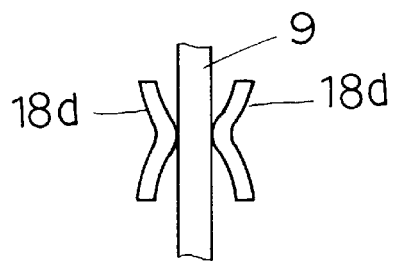
FIG. 12A   FIG. 12B   FIG. 12C
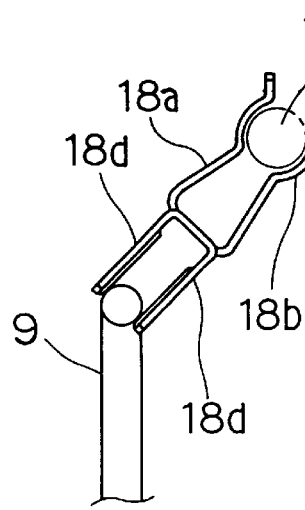 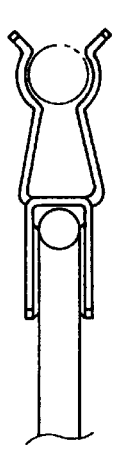 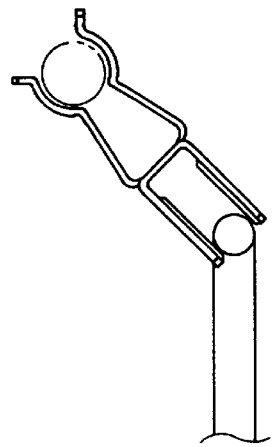

DEVICE FOR AUTOMATICALLY CHANGING AIR DIRECTION

CROSS-REFERENCE TO RELATED APPLICATION

This application is related to and claims priorities from Japanese Patent Applications No. 8-243817 filed on Sep. 13, 1996, No. 8-243818 filed on Sep. 13, 1996, and No. 8-243824 filed on Sep. 13, 1996, the contents of which are hereby incorporated by reference.

BACKGROUND OF THE INVENTION

1. Field of the Invention

The present invention relates to a device for automatically changing air direction, which is suitably employed for a control device for automatically changing a flow direction of conditioned air blown from an air outlet of an air conditioning device in a passenger compartment of a vehicle.

2. Description of Related Art

Conventionally, a device for automatically changing air direction of an air conditioning device for a vehicle is described in JP-Y2-3-47167. In the conventional device, a power transmission mechanism transforms a rotational operation of a reduction motor by a ring mechanism to linearly operate a rod which is mechanically connected to the reduction motor. Further, an axial direction of the reduction motor is perpendicular to a direction of a linear operation of the rod. By linearly operating the rod, a plate for air direction is rocked in the direction of the linear operation of the rod.

However, in the conventional device, a large space is necessary for installing the device for automatically changing air direction in a vehicle, and a noise due to the operation of the reduction mechanism is caused. Further, because the axial direction of the reduction motor is perpendicular to the direction of the linear operation of the rod, the space for installing the device for automatically changing air direction is further increased.

Further, in a conventional device for automatically changing air direction, a drive-controlling mechanism is constructed by a reduction motor and a transmission member for transmitting a driving force of the reduction motor to a plate for changing air direction, an electric substrate for controlling the reduction motor is attached to a housing, and the drive-controlling mechanism is inserted in a frame body having an air grill. However, in the conventional device, a part of the transmission member is attached to the frame body and a part of the transmission member is attached to an output shaft of the reduction motor. Therefore, assembling performance of the drive-controlling mechanism is deteriorated.

Further, a conventional device for automatically changing air direction is described in JP-Y2-62-18919. In the conventional device, a plate is rotatably supported in a frame body for forming an air passage, and a driving force of an electric motor is transmitted to the plate through a driving force transmission portion to automatically rock the plate. Further, a clutch mechanism is formed to interrupt the driving force transmitted from the electric motor to the plate. In the clutch mechanism, a rotational shaft of the plate protrudes from the frame body to penetrate through the frame body, and a spring is attached to an end of the rotational shaft by a vis. Therefore, assembling performance of the clutch mechanism is deteriorated.

SUMMARY OF THE INVENTION

In view of the foregoing problems, it is a first object of the present invention to provide a device for automatically changing air direction, which has a downsized compact structure.

It is a second object of the present invention to provide a device for automatically changing air direction, in which a drive-controlling mechanism of the device can be fitted to a frame body by one step to improve the assembling performance of the drive-controlling mechanism.

It is a third object of the present invention to provide a device for automatically changing air direction, in which a clutch mechanism can be readily assembled.

According to a first aspect of the present invention, the device for automatically changing air direction includes a step motor which has a rotor and a stator disposed on an outer peripheral portion of the rotor and controls a rotation of the rotor, and a transmission member which reciprocates linearly in an axial direction of the rotor by the rotation of the rotor to rock a plate in the axial direction of the rotor.

According to the structure, a reduction mechanism is not necessary, the transmission member linearly reciprocates in the axial direction of the step motor to rock the plate in the axial direction. Therefore, a space of a transformation portion for transforming a rotation operation to a linear operation becomes extremely smaller, and the size of the device for automatically changing air direction can be made smaller.

Further, a cover portion for covering a male screw portion is formed at an outer peripheral portion of the male screw portion. Therefore, an foreign object such as dust is not attached on the male screw portion.

Further, the device for automatically changing air direction includes a rotation-interrupting mechanism for interrupting a rotation of the transmission member with the rotation of the rotor. Therefore, the transmission member does not rotate with the rotation of the rotor so that the plate can be effectively linearly rocked.

Further, the frame body has two air outlet portions formed proximately in series, the step motor is disposed in such a manner that the axial direction of the rotor corresponds to the series direction of the two air outlet portions, the transmission member is disposed at each of two end portion of the rotor in the axial direction, and the flow direction of air blown from the two air outlet portions is changed by rocking the plate when the rotor rotates and the transmission member linearly reciprocates. Therefore, the flow direction of air blown from the two air outlet portions is changed by one step motor.

Further, the frame body has two partition plates which partition the two air outlet portions, and the step motor is formed between the partition plates. Therefore, the step motor does not interrupt air introducing to the two air outlet portions, and conditioned air can be effectively blown out from the two air outlet portions to the passenger compartment.

According to a second aspect of the present invention, a drive-controlling mechanism includes: an electric motor for rocking a plate; a control portion for electrically controlling the electric motor; and a transmission member connected to the plate, for transmitting a driving force of the electric motor to the plate. The electric motor, the control portion and the transmission member are integrally assembled, and the drive-controlling mechanism assembled integrally is directly fitted to a frame body. Therefore, the drive-controlling mechanism can be fitted to the frame body by one step. As a result, the assembling performance of the drive-controlling mechanism cam be extremely improved.

Further, the transmission member includes a friction clutch mechanism for interrupting the connection between the transmission member and the plate when an external force more than a predetermined value is applied to the plate. Thus, when a force more than the predetermined value is applied to the plate by a passenger in the passenger compartment, the connection between the transmission member and the plate can be interrupted by the friction clutch mechanism so that the direction of the plate can be arbitrary changed.

Further, a mount portion made of an elastic material is fitted to the electric motor or the control portion, and the drive-controlling mechanism is directly fitted to the frame body by elastically deforming the mount portion through the mount portion. Therefore, vibration caused in the drive-controlling mechanism can be effectively absorbed by the elasticity of the mount portion.

According to a third aspect of the present invention, a driving force transmission portion is connected to an electric motor, for transmitting a driving force of the electric motor to a plate to automatically rock plate. The driving force transmission portion includes a clutch mechanism for interrupting the driving force transmitted from the electric motor to the plate when an external force more than a predetermined value is applied to the plate, and a motor side transmission member connected to the electric motor. The clutch mechanism is disposed between the plate and the motor side transmission member, and includes a motor side connection portion connected to the motor side transmission member and a plate side connection portion connected to the plate. Further, the plate side connection portion is engaged to the plate to directly insert the plate therein. According to the structure, because the plate side connection portion directly insert the plate therein, it is not necessary to connect the plate side connection portion and the plate by a vis or the like. As a result, the assembling performance of the clutch mechanism can be extremely improved.

Further, a connection plate for connecting a plurality of plate members is provided in the plate members to integrally rock the plate members, an arm portion is connected to the connection plate and extends to a direction of plate surfaces of the plate members, and the plate side connection portion is engaged with the arm portion to insert the arm portion therein from the rocking direction of the plate members. Thus, the whole plate members can be readily rocked, and the plate side connection portion and the plate members can be readily engaged so that the plate side connection portion and the plate members reciprocate in the rocking direction.

Further, the clutch mechanism includes a connection portion connected to the motor side connection portion, and the motor side connection portion and the connection portion interrupt the driving force transmitted from the electric motor to the plate when an external force more than a predetermined value is applied to the plate. Therefore, the clutch mechanism can be readily fitted to the plate when the device for automatically changing air direction is assembled.

Further, the connection portion has an arcuate outer surface, and the motor side connection portion is frictionally engaged with the connection portion to insert the outer surface of the connection portion therein by an elastic force of the motor side connection portion. Therefore, the motor side connection portion rotates relative to the connection portion when the direction of the plate is arbitrarily changed by a passenger in the passenger compartment. As a result, a uniform operation force is applied to the plate.

BRIEF DESCRIPTION OF THE DRAWINGS

Additional objects and advantages of the present invention will be more readily apparent from the following detailed description of preferred embodiments when taken together with the accompanying drawings, in which:

FIGS. 10A, 10B and 10C are diagrammatic views showing operation states of the device for automatically changing air direction according to the first embodiment;

FIG. 11 is a bottom view when viewed from the lower side to the upper side in FIG. 10A;

FIGS. 12A, 12B and 12C are diagrammatic views showing operation states of the device for automatically changing air direction according to the first embodiment;

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be described. In the first embodiment, a device 1 for automatically changing air direction is applied to an air conditioning device for a vehicle.

Figure 1:
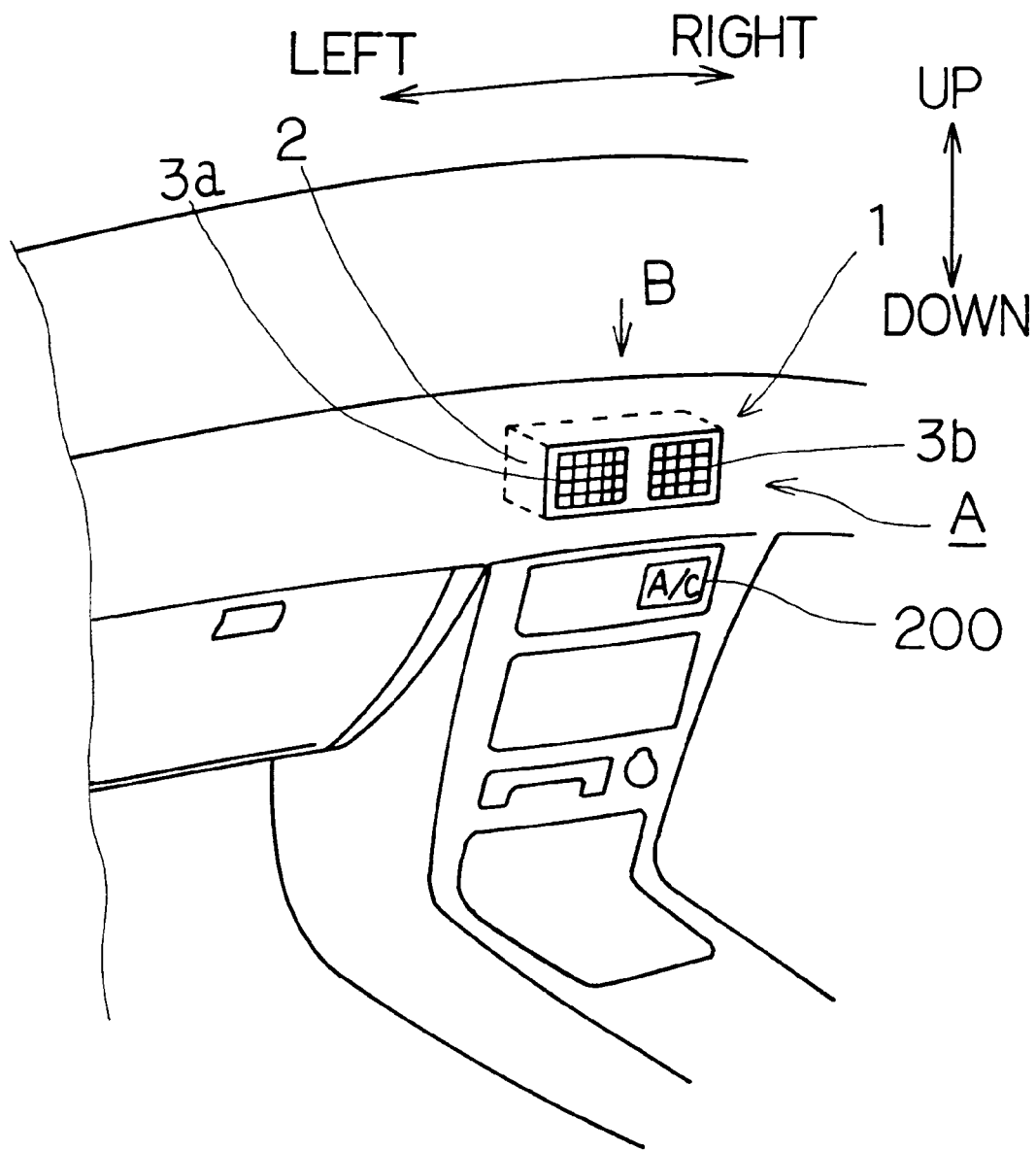
FIG. 1 a diagrammatic view showing an installation position of a device for automatically changing air direction according to a first preferred embodiment of the present invention.

As shown in FIG. 1, the device 1 for automatically changing air direction is disposed at a center portion of an instrument panel portion A of a passenger compartment in a vehicle width direction. Further, an air conditioning switch 200 for blowing conditioned air from an air conditioning device (not shown) into the passenger compartment is disposed on the instrument panel portion A.

Figure 2:
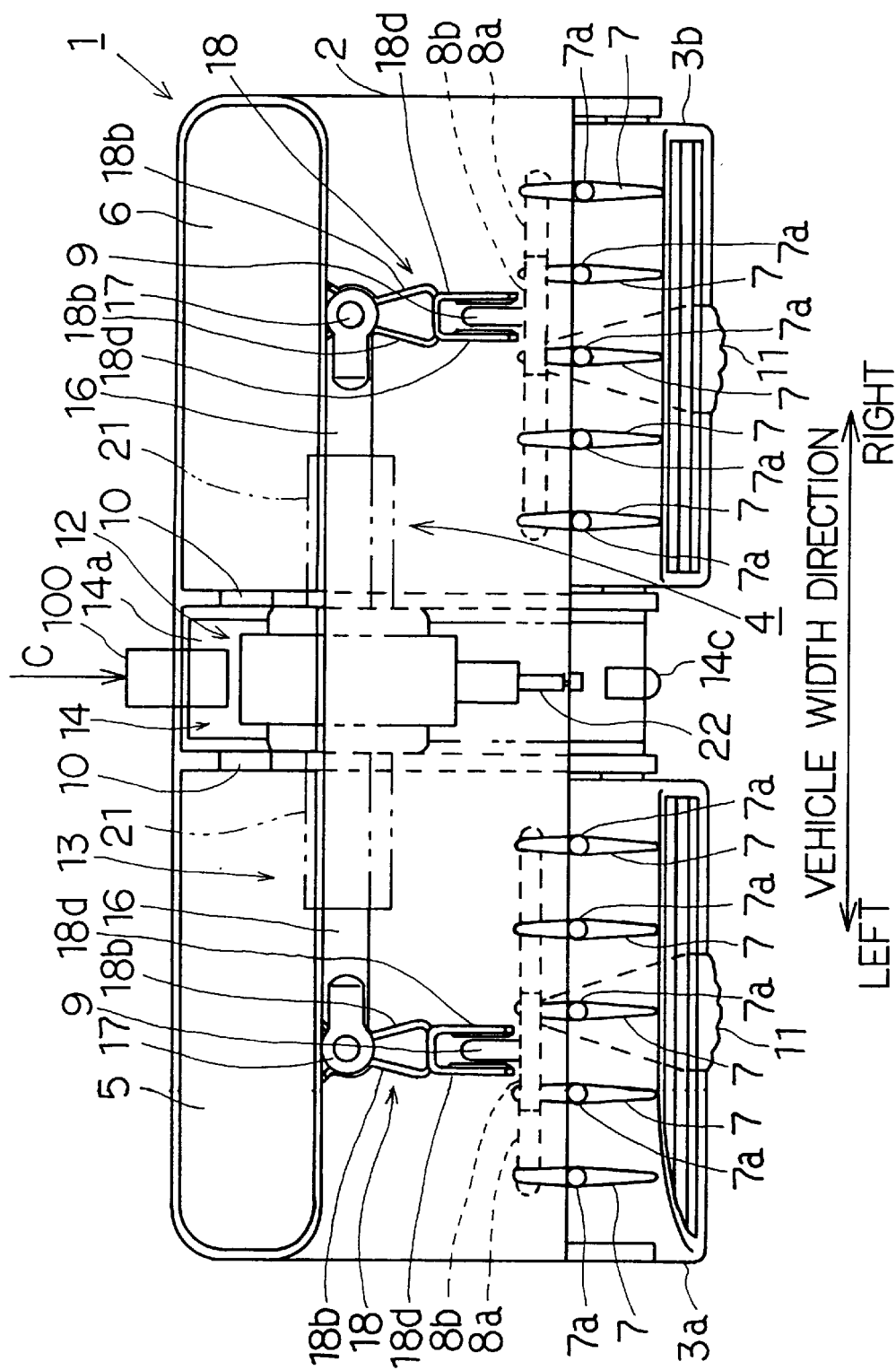
FIG. 2 is a perspective view showing the device for automatically changing air direction when viewed from B direction in FIG. 1.

As shown in FIG. 2, the device 1 for automatically changing air direction includes a frame body 2, air grilles 3a and 3b formed in the frame body 2, and an automatic rocking mechanism 4 for automatically rocking a flow direction of conditioned air blown from the air grilles 3a and 3b in the vehicle width direction.

The frame body 2 is made of a resin material such as polypropylene. By both partition plates 3c shown in FIG. 3, two air passages 5 and 6 are separated from each other as shown in FIG. 2. The two air passages 5 and 6 are formed in series in the vehicle width direction to have a distance therebetween. Conditioned air is introduced from the air conditioning device (not shown) to the air passages 5 and 6. U-shaped holding portions 10 for holding the automatic rocking mechanism 4 are respectively formed on the partition plates 3c.

Each of the air grilles 3a and 3b made of a resin material such as polypropylene is formed in a cylindrical shape, and is disposed in each of the air passages 5 and 6. That is, the air grills 3a and 3b are proximately disposed in series in the vehicle width direction as shown in FIG. 1.

The air grilles 3a and 3b are a design surface in the passenger compartment, and form air outlets for blowing conditioned air into the passenger compartment. Further, the air grilles 3a and 3b can change a flow direction of conditioned air in the vehicle width direction and in the up-down direction.

Since the frame body 2 and the air grilles 3a and 3b approximately have symmetrical structure in the left and right sides as shown in FIG. 2, only the air grill 3a formed at the left side in FIG. 2 will be described.

A plurality of plate-shaped vertical fins 7 disposed to extend to a vertical direction in FIG. 2 (i.e., extend from front side to back side in FIG. 2) are formed in the air grill 3a in series in the vehicle width direction.

A rotational shaft 7a is formed integrally with each vertical fin 7 at both end portions in the vertical direction in FIG. 2, and is rotatably supported to the air grill 3a. Therefore, the vertical fins 7 can be rocked in the left-right direction in FIG. 2 so that the flow direction of conditioned air blown from the air grill 3a can be changed in the vehicle width direction.

Connection plates 8a and 8b for connecting the whole vertical fins 7 are formed in the vertical fins 7 so that the vertical fins 7 can be rocked together. Further, as shown in FIG. 3, the connection plate 8a is attached to the vertical fins 7, and rotational shafts 7c formed integrally with the vertical fins 7 penetrate through the connection plate 8a.

When the connection plates 8a and 8b are moved in the left-right direction in FIG. 2, the whole vertical fins 7 rock in the left-right direction in FIG. 2. The connection plate 8b connects adjacent two vertical fins 7, and is attached to the vertical fins 7 in such a manner that the rotational shaft (not shown) formed integrally with the vertical fins 7 penetrate through the connection plate 8b, similarly to the connection plate 8a.

Figure 3:
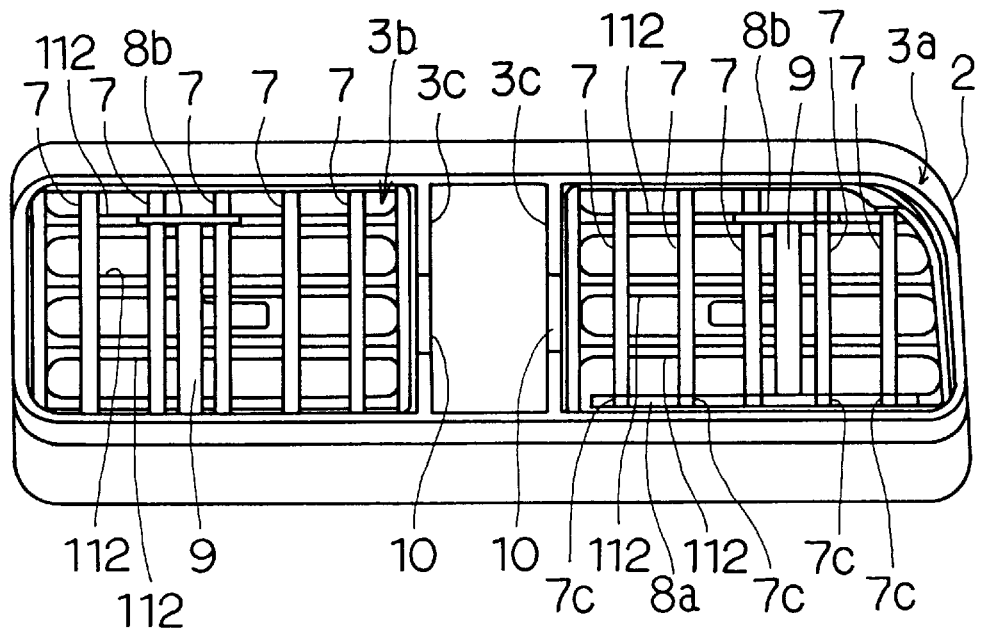
FIG. 3 is a top view showing the device for automatically changing air direction when viewed from an upper side to a lower side in FIG. 2.
Figure 4:
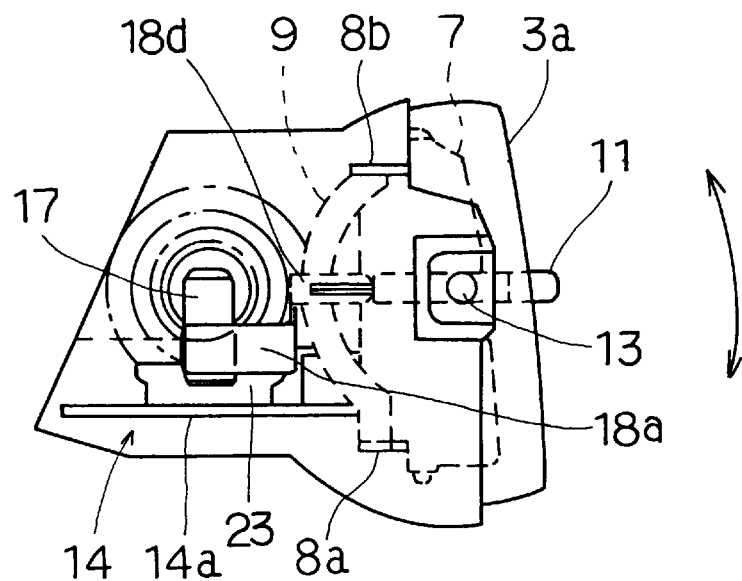
FIG. 4 is a side perspective view showing the device for automatically changing air direction when viewed from a left side to a right side in FIG. 2.

An arm portion 9 is formed integrally with the connection plates 8a and 8b to connect the connection plates 8a and 8b. as shown in FIG. 3. As shown in FIG. 4, the arm portion 9 is formed in circular arch shape in cross-section. One end of the arm portion 9 is fixed to the connection plate 8a and another end thereof is fixed to the connection plate 8b.

When the arm portion 9 is moved in the left-right direction in FIG. 3, the whole vertical fins 7 integrally rock in the vehicle width direction so that the flow direction of conditioned air blown from the air grilles 3a and 3b is changed.

Further, as shown in FIG. 2, an operation lever 11 is formed at one vertical fin 7 placed at a center portion among the plurality of the vertical fins 7 to protrude to the passenger compartment. When the flow direction of conditioned air (i.e., the direction of the vertical fins 7) is manually changed by a passenger in the passenger compartment, the operation lever 11 is operated. That is, when the operation lever 11 is moved in the left-right direction in FIG. 2, the whole vertical fins 7 integrally change the direction thereof through the connection plates 8a and 8b.

Further, a plurality of horizontal fins 112 extending in a horizontal direction are formed integrally with the air grilles 3a and 3b as shown in FIG. 3. By the horizontal fins 112, the flow direction of conditioned air can be changed in the up-down direction of the passenger compartment. In the first embodiment, since a rotational shaft 13 formed integrally with the air grill 3a is rotatably supported to the frame body 2, the air grill 3a can be rotated in the up-down direction (i.e., the direction shown by arrow in FIG. 4).

Figure 5:
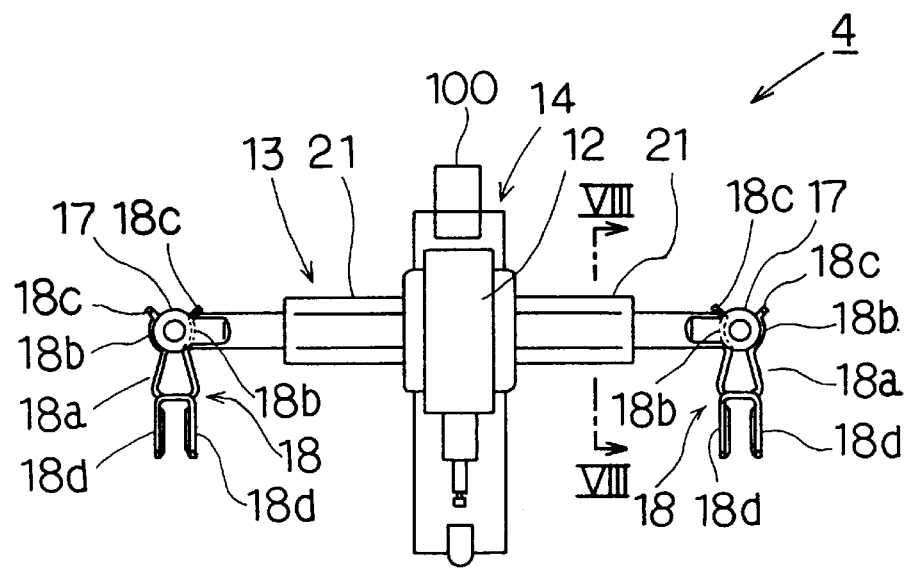
FIG. 5 is a view showing an automatic rocking mechanism according to the first embodiment.
Figure 8:
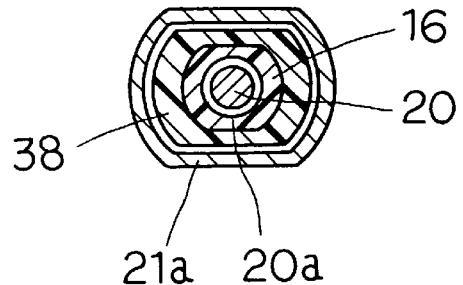
FIG. 8 is a sectional view taken along line VIII—VIII in FIG. 5.
Figure 6:
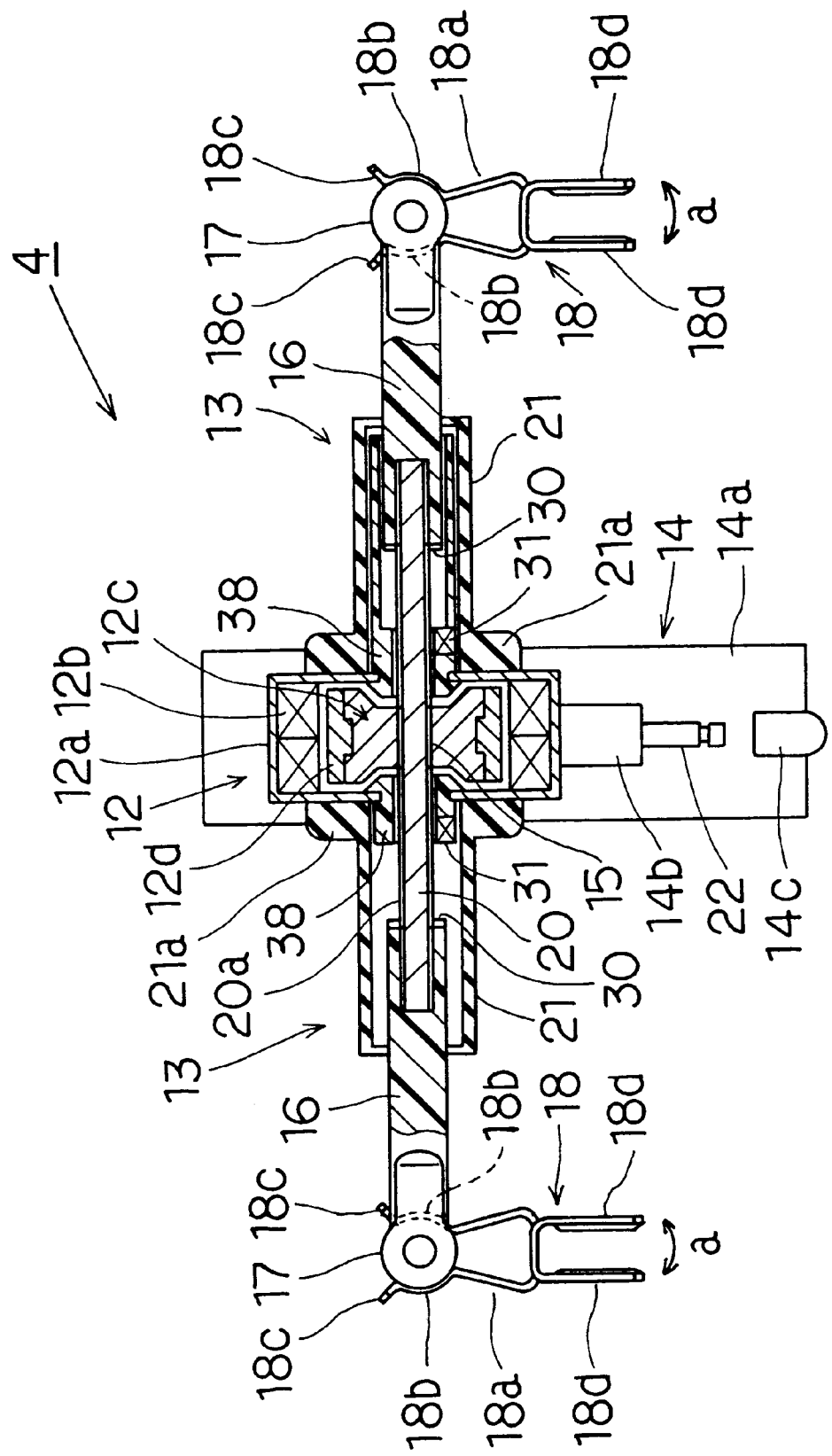
FIG. 6 is a partly sectional view of the automatic rocking mechanism cut in parallel with the paper in FIG. 5.

Next, the automatic rocking mechanism 4 will be described. FIG. 5 shows the automatic rocking mechanism 4, FIG. 6 is a partly sectional view of the automatic rocking mechanism cut in parallel with the paper in FIG. 5, and FIG. 8 is a sectional view taken along line VIII—VIII in FIG. 5.

As shown in FIG. 5, the automatic rocking mechanism 4 includes a step motor 12 which is an electric motor for rocking the vertical fins 7, a transmission portion 13 for transmitting a driving force of the step motor 12 to the arm portion 9, and a control portion 14 for electrically driving and controlling the step motor 12.

In the first embodiment, the step motor 12 employs a linear type step motor. As shown in FIG. 6, the step motor 12 includes a motor housing 12a made of metal, a rotor 12c disposed rotatably coaxially within the motor housing 12a, and a stator coil 12b which is disposed at an outer peripheral portion of the rotor 12c and is fixed on an inner surface of the motor housing 12a.

The stator coil 12 is wound around a resinous bobbin. A cylindrical magnet 12d magnetized in multiple poles is disposed on an outer peripheral portion of the rotor 12c. A step angle of the step motor 12 is determined by the magnetized number of the cylindrical magnet 12d and magnetic pole number of the stator coil 12b. That is, the rotational operation (i.e., rotational angle or rotational speed) of the rotor 12c can be controlled by frequency of a pulse signal input to the stator coil 12b and the like.

A female screw portion 15 is formed around an axis of the rotor 12c to penetrate through the rotor 12c in the axial direction. A male screw portion 20a is formed on an outer peripheral surface of a screw shaft 20, and the screw shaft 20 is screwed into the female screw portion 15. The screw shaft 20 is disposed to protrude from two end portions of the rotor 12c in the axial direction (i.e., the left-right direction in FIG. 6).

A pair of cylindrical rotor guides 38 made of resin are disposed at the two end portions of the rotor 12c in the axial direction, as shown in FIG. 6. The rotor guides 38 perform a guide function to hole the rotor 12c in the axial direction without rattling. One end of each of the rotor guides 38 is fixed to the motor housing 12a. Further, an electric contact 31 is formed on each of the rotor guides 38.

The transmission portion 13 includes a pair of ring rods 16 and a pair of connection clip portions 18 connected to the ring rods 16. The ring rods 16 are screwed with the two ends of the screw shaft 20 as shown in FIG. 6. Further, an electric contact 30 is formed on one end portion of each ring rod 16, and is moved in the left-right direction in FIG.6 with the ring rods 16. Functions of the electric contacts 30 and 31 will be described later.

The cylindrical rotor guide 38 placed at the right side in FIG. 6 is formed to extend in the axial direction of the screw shaft 20 to cover the screw shaft 20. The ring rod 16 placed at the right side in FIG. 6 is screwed into a cylindrical space formed between the rotor guide 38 and the screw shaft 20.

Next, the functions of the rotor guide 38 and the ring rod 16 placed at the right side in FIG. 6 are described with reference to FIG. 8.

As shown in FIG. 8, the rotor guide 38 is formed in a deformed cylindrical shape having opposing flat surfaces, and the ring rod 16 is screwed between the rotor guide 38 and the screw shaft 20. In the first embodiment, because an outer shape of the ring rod 16 is formed to engage with an inner surface shape of the rod guide 38, the ring rod 16 is not rotated relative to the rotor guide 38 fixed to the motor housing 12a.

Specifically, when the rotor 12c rotates, the female screw portion 15 of the rotor 12c also rotates. Thus, the male screw portion 20a of the screw shaft 20 are moved by the female screw portion 15 so that the screw shaft 20 and the ring rod 16 linearly reciprocate in the left-right direction in FIG. 6 (i.e., the axial direction of the rotor 12c).

That is, by the female screw portion 15 of the rotor 12c and the male screw portion 20a of the screw shaft 20, the rotational operation of the rotor 12c is transformed to a linear operation of the screw shaft 20. The reciprocating direction of the screw shaft 20 can be changed by the shapes of the female screw portion 15 and the male screw portion 20a.

When the rotor 12c rotates, the screw shaft 20 linearly reciprocates in the left-right direction in FIG. 6. However, when the screw shaft 20 is not fixed, the screw shaft 20 is also rotated with the rotation of the rotor 12c, and the ring rod 16 connected to the screw shaft 20 is also rotated. Because the vertical fins 7 are rocked in the direction of the linear operation according to the linear operation of the ring rod 16, the vertical fins 7 do not perform the rocking operation when the ring rod 16 rotates.

As described above, in the first embodiment, the rotor guide 38 is fixed to the motor housing 12a, and the outer shape of the ring rod 16 is formed to be engaged with the inner shape of the rod guide 38 to form the deformed cylindrical shape having the opposing flat surfaces. Therefore, it can prevent the screw shaft 20 from being rotated with the rotation of the rotor 12c. Thus, since the screw shaft 20 and the ring rod 16 only linearly reciprocate, the rocking operation of the vertical fins 7 is accurately performed.

A pair of mount portions 21 made of an elastic material such as butyl rubber or silicon rubber are respectively formed in a cylindrical shape, as shown in FIG. 6. The mount portions 21 absorb a vibration generated in the automatic rocking mechanism 4 without transmitting to the frame body 2 and the vehicle when the automatic rocking mechanism 4 is installed in the frame 2.

The pair of the mount portions 21 are formed to cover outer peripheral portions of the ring rods 16 and the screw shaft 20. Each of the mount portions 21 has an enlarged diameter portion 21a at one end side thereof. The enlarged diameter portions 21a are bonded and fixed to the motor housing 12a by adhesive. Further, as shown in FIG. 6, since the outer peripheral portion of the screw shaft 20 placed at the left side in FIG. 6 is covered by the mount portion 21 and the outer peripheral portion of the screw shaft 20 placed at the right side is covered by the rotor guide 38, a foreign object such as dust is not attached on the male screw portion 20 of the screw shaft 20.

Figure 7:
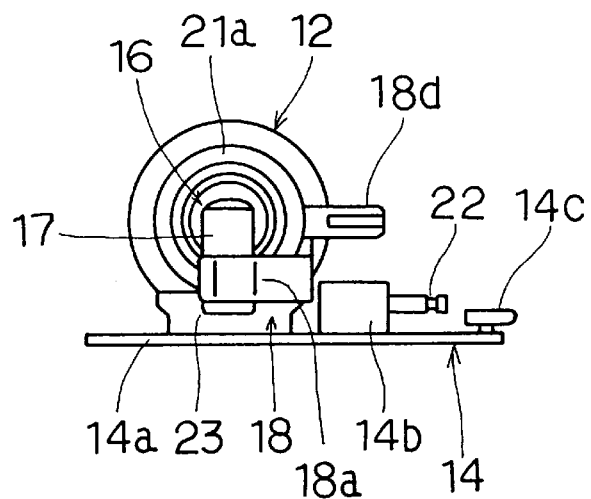
FIG. 7 is a side view showing the automatic rocking mechanism when viewed from the left side to the right side in FIG. 2.

As a result, the rotational operation of the rotor 12c is smoothly transformed to the linear operation of the ring rod 16 so that the automatic rocking mechanism 4 can be effectively operated. As shown in FIG. 7, another end portion of the ring rod 16 is bent at a right angle so that an arcuate connection portion 17 is formed. The connection clip portion 18 made of metal having elasticity (in the first embodiment, spring steel) is connected to the connection portion 17.

A pressure portion is formed in a U-shape at one end portion of the connection clip portion 18 as shown in FIG. 6. A pair of arcuate portions 18b engaged with an outer shape of the connection portion 17 are formed at the pressure portion 18a. The connection portion 17 is sandwiched between the pair of the arcuate portions 18b of the connection clip portion 18. Further, guide portions 18c inclined outwardly are respectively formed at top end portions of the arcuate portions 18a.

When the connection clip portion 18 is attached to the connection portion 17, the connection clip portion 18 is press-fitted to the connection portion 17 from the guide portions 18c in a direction from a lower side to an upper side in FIG. 6 so that the pair of the pressure portions 18a are elastically deformed to be separated from each other.

When the connection clip portion 18 is press-fitted to the connection portion 17, the connection portion 17 is sandwiched between the arcuate portions 18b of the connection clip portion 18. In the first embodiment, the connection clip portion 18 and the connection portion 17 are engaged by a friction therebetween. That is, the connection clip portion 18 is attached on the connection portion 17 by an elastic force and a friction force of the connection clip portion 18. When an external force more than a predetermined value is applied to the connection clip portion 18 in a direction shown by an arrow "a" in FIG. 6, the connection clip portion 18 rotates relative to the connection portion 17 in the "a" direction in FIG. 6.

A pair of U-shaped inserting portions 18d are formed at another end portions of the connection clip portions 18 as shown in FIG. 6. As shown in FIG. 2, when the automatic rocking mechanism 4 is installed in the frame body 2, the arm portions 9 are directly inserted into the inserting portion 18d.

Here, a process for forming the connection clip portion 18 will be described with reference to FIG. 4. In the first embodiment, the connection clip portion 18 is formed by bending a piece of plate having two side end portions at an upper side and two side end portions at a lower side. Specifically, a piece of the plate is disposed to be perpendicular to the paper surface in FIG. 4 in the up-down direction of FIG. 4. The two side end portions of the plate at the upper side are bent at the right side in FIG. 4 in parallel with the paper surface so that the inserting portion 18d is formed.

Further, side end portions of the plate at the lower side are bent at the left side in FIG. 4 in parallel with the paper surface so that the pressure portion 18a is formed. When the bending process of the plate is performed to form the connection clip portion 18, the pressure portion 18a and the inserting portion 18d have a common rib portion. Therefore, the connection clip portion 18 can be readily formed. The functions of the connection clip portion 18 will be described later.

As shown in FIGS. 5–7, the control portion 14 includes an electric substrate 14a, a rocking switch 14b and a light emitting diode 14c.

A ROM (not shown) and the like are provided on the electric substrate 14a. A control program for controlling a rotation of the rotor 12c of the step motor 12 is stored in the ROM. That is, the electric substrate 14a outputs a predetermined pulse signal to the stator 12b to control a rotational direction, a rotational speed and a rotational angle of the rotor 12c. Thus, a reciprocating direction, a reciprocating speed and a reciprocating amount of the ring rod 16 can be controlled by the electric substrate 14a.

The rocking switch 14b is electrically connected to the electric substrate 14a. In the first embodiment, the rocking switch 14b is fixed on the electric substrate 14a by brazing. The rocking switch 14b drives or stops the rotor 12c through the electric substrate 14a. An operation portion 22 is formed on the rocking switch 14b. When the operation portion 22 is pushed to the upper side in FIG. 6, the rocking switch 14 drives the rotor 12c through the electric substrate 14a to rock the vertical fins 7. When the operation portion 22 is pushed again to the upper side in FIG. 6, the rotation of the rotor 12c is stopped to stop the rocking operation of the vertical fins 7.

The right emitting diode 14c is electrically connected to the electric substrate 14a, and is fixed on the electric substrate 14a by brazing. The light emitting diode 14c is a back light illuminating the operation portion 22 when an illumination switch (not shown) of the vehicle is turned on. As shown in FIGS. 4 and 7, a mount portion 23 made of polyacetal type resin material having an elasticity is fitted by an adhesive on the electric substrate 14a to which the rocking switch 14b and the light emitting diode 14C are attached.

The step motor 12 is bonded and fixed on the mount portion 23 by adhesive. Specifically, the outer peripheral portion of the motor housing 12a of the step motor 12 is bonded on the mount portion 23 by adhesive. Further, the electric substrate 14a is formed in a rectangular, a longitudinal direction of the electric substrate 14a is perpendicular to the axial direction (i.e., the left-right direction in FIG. 6) of the rotor 12c. Further, the rocking switch 14b and the light emitting diode 14c are disposed in series in the longitudinal direction of the electric substrate 14a. An input terminal 100 shown in FIG. 5, for receiving signals from an electric switch and the control device (not shown) of the air conditioning device, is fixed on the electric substrate 14a.

Next, a method for assembling the automatic rocking mechanism 4 and the frame body 2 will be described.

In the automatic rocking mechanism 4, the step motor 12, the control portion 14 and the transmission portion 13 are integrally assembled beforehand.

The step motor 12 is press-inserted between the partition plates 3c from the direction shown by arrow "C" in FIG. 2 so that two end portions of the step motor 12 in the axial direction are press-fitted to the partition plates 3c. Specifically, after the two end portions of the step motor 12 are press-inserted into the groove shaped holding portions 10 to crush the mount portion 21 bonded to the motor housing 12a, the step motor 12 is further inserted so that the step motor 12 is held between the two partition plates 3c. Then, the arm portion 9 is inserted into the pressure portion 18d of the connection clip portion 18 from the rocking direction (i.e., the left-right direction in FIG. 2) of the vertical fins 7 to connect the connection clip portion 18 and the arm portion 9. In the assembling method, it is necessary to determine the positions of the connection clip portion 18 and the arm portion 9 beforehand.

As described above, in the first embodiment, the whole automatic rocking mechanism 4 is simply fitted to the frame body 2 by one step, the assembling performance of the automatic rocking mechanism 4 can be extremely improved. When it is necessary to maintain and check the automatic rocking mechanism 4, for example, a force is applied to the automatic rocking mechanism 4 in a direction opposite to the direction shown by the arrow "C" in FIG. 2 so that the arm portion 9 is simply separated from the inserting portion 18d. Therefore, the automatic rocking mechanism 4 can be readily removed from the frame body 2.

Further, the vibration generated in the automatic rocking mechanism 4 is absorbed by the mount portion 21 to effectively prevent the vibration transmitted to the frame body 2 or the vehicle. Therefore, an unstable state of the automatic rocking mechanism 4 can be prevented, and the automatic rocking mechanism 4 can be effectively operated.

Because the step motor 12 is disposed between the two partition portions 3c, conditioned air introduced into the air passages 5 and 6 is not interfered by the step motor 12, and can be effectively blown out from the air grills 3a and 3b without decreasing an air amount.

Next, the operation of the automatic rocking mechanism 4 will be described. FIGS. 10A–10C show operation states of a main portion of the automatic rocking mechanism 4, that is, shows three operation states of the arm portion 9 and the connection clip portion 18 when the connection clip portion 18 is not rotated relative to the connection portion 17. The operation state shown in FIG. 10B corresponds to the state shown in FIG. 2.

In the first embodiment, because the step motor 12 employs a linear type step motor and is operated by pulse signals having a certain frequency, the step motor 12 rotates in a uniform rotational speed. In this state shown in FIG. 10B, when the step motor 12 is rotated, the ring rod 16 is linearly moved in a uniform speed to the vehicle right side in FIG. 2.

By the rotation of the rotor 12c, the ring rod 16 linearly reciprocates in the axial direction of the rotor 12c, and the connection clip portion 18 attached to the connection portion 17 of the ring rod 16 is also linearly operated in the same speed. By the connection clip portion 18, the arm portion 9 becomes from the operation state shown in FIG. 10B to the operation state shown in FIG. 10C when the step motor is rotated in the state shown in FIG. 10B. Because the inserting portion 18d of the connection clip portion 18 inserts the arm portion 9 from the rocking direction of the vertical fins 7, the whole vertical fins 7 can be readily rocked through the connection plates 8a and 8b. Further, the inserting portion 18d does not slant from the rocking direction of the vertical fins 7. As a result, the flow direction of conditioned air blown out from the two air grilles 3a and 3b is readily accurately changed toward the left side of the vehicle (i.e., the passenger compartment) in FIG. 2.

Here, when the rotor 14 rotates and an external force is not applied to the vertical fins 7, the connection clip portion 18 does not rotate relative to the connection portion 17 by the elastic force and the friction force of the pressure portion 18a.

Next, to change the flow direction of conditioned air to the right side of the vehicle (i.e., the passenger compartment) in FIG. 2, the arm portion 9 becomes from the operation state shown in FIG. 10C to the operation state shown in FIG. 10A. In this case, the rotational direction of the rotor 12c of the step motor 12 is opposite to the above-described rotational direction. As a result, the ring rod 16 moves to the left side in FIG. 2 in a uniform speed.

Thus, the flow direction of conditioned air blown out from the air grills 3a and 3b changes toward the right side of the vehicle (i.e., passenger compartment) in FIG. 2. Similarly, the connection clip portion 18 does not rotate relative to the connection portion 17. By repeating the above-described operations with the rotation of the rotor 12c of the step motor 12, the ring rod 16 linearly reciprocates in the axial direction of the rotor 12c to rock the vertical fins 7 in the vehicle width direction.

In the first embodiment, to perform the above-described rocking operation of the vertical fins 7, the step motor 12 is used and the ring rod 16 is disposed in such a manner that the direction of the liner reciprocating direction of the ring rod 16 corresponds to the rocking direction of the vertical fins 7. Therefore, a conventional reduction mechanism is not necessary, and a space for locating the transmission portion for transmitting the rotational operation to the linear operation becomes extremely small. Thus, the size of the automatic rocking mechanism 4 becomes smaller than that of the conventional one to have a compact structure.

As shown in FIG. 4, the air grill 3a can be rotated in the up-down direction (i.e., the arrow direction shown in FIG. 4), and the inserting portion 18d of the connection clip portion 18 does not move in the up-down direction. Therefore, the arm portion 9 is formed in the arcuate shape to always engage the arm portion 9 and the inserting portion 18d when the air grill 3a rotates in the up-down direction.

In the first embodiment, since the arm portion 9 is formed in the arcuate shape, the inserting portion 18d of the connection clip portion 18 is approximately formed in a v-shape as shown in FIG. 11.

In the first embodiment, the direction of each vertical fin 7 can be arbitrarily changed by the operation lever 11, the connection clip portion 18 can be rotate relative to the connection portion 17 when a passenger in the passenger compartment operates the operation lever 11. The operation states of the connection portion 17, the connection clip portion and the arm portion 9 show in FIGS. 12A, 12B and 12C.

As shown in FIGS. 12A, 12B and 12C, when the operation lever 11 is operated, the connection clip portion 18 rotates relative to the connection portion 17. According to the movement of the connection portion 17, engaging portion between the inserting portion 18d of the connection clip portion 18 and the arm portion 9 is changed. However, in the operation states shown in FIGS. 12A, 12B and 12C, the arm portion 9 and the inserting portion 18d of the connection clip portion 18 are always engaged with each other, and the inserting portion 18d contacts and inserts the arm portion 9 from two side, approximately.

For example, when the connection portion 17 is moved from the operation state shown in FIG. 12B to the operation state shown in FIG. 12A, the engaging position between the inserting portion 18d and the arm portion 9 moves, and a force is applied to the inserting portion 18d by the arm portion 9 to expand the inserting portion 18d. The inserting portion 18d inserts the arm portion 9 in the left-right direction in FIG. 4. Therefore, when the inserting portion 18d has a simple plate shape, the upper and lower both ends of the inserting portion 18d strike to the arm portion 9 so that a force is applied to the inserting portion 18d by the arm portion 9 to expend the inserting portion 18d. As a result, when the connection portion 17 is moved from the operation state in FIG. 12B to the left-right direction, an error may be caused in the automatic rocking mechanism 4.

In the first embodiment, as shown in FIG. 11, because each of the inserting portion 18d of the connection clip portion 18 is approximately formed in the V shape, it can prevent the arm portion 9 and the inserting portion 18d from striking each other. As a result, the automatic rocking mechanism 4 can be smoothly operated.

Next, the operation of the automatic rocking mechanism 4 will be described with reference to the flow chart in FIG. 9.

Figure 9:
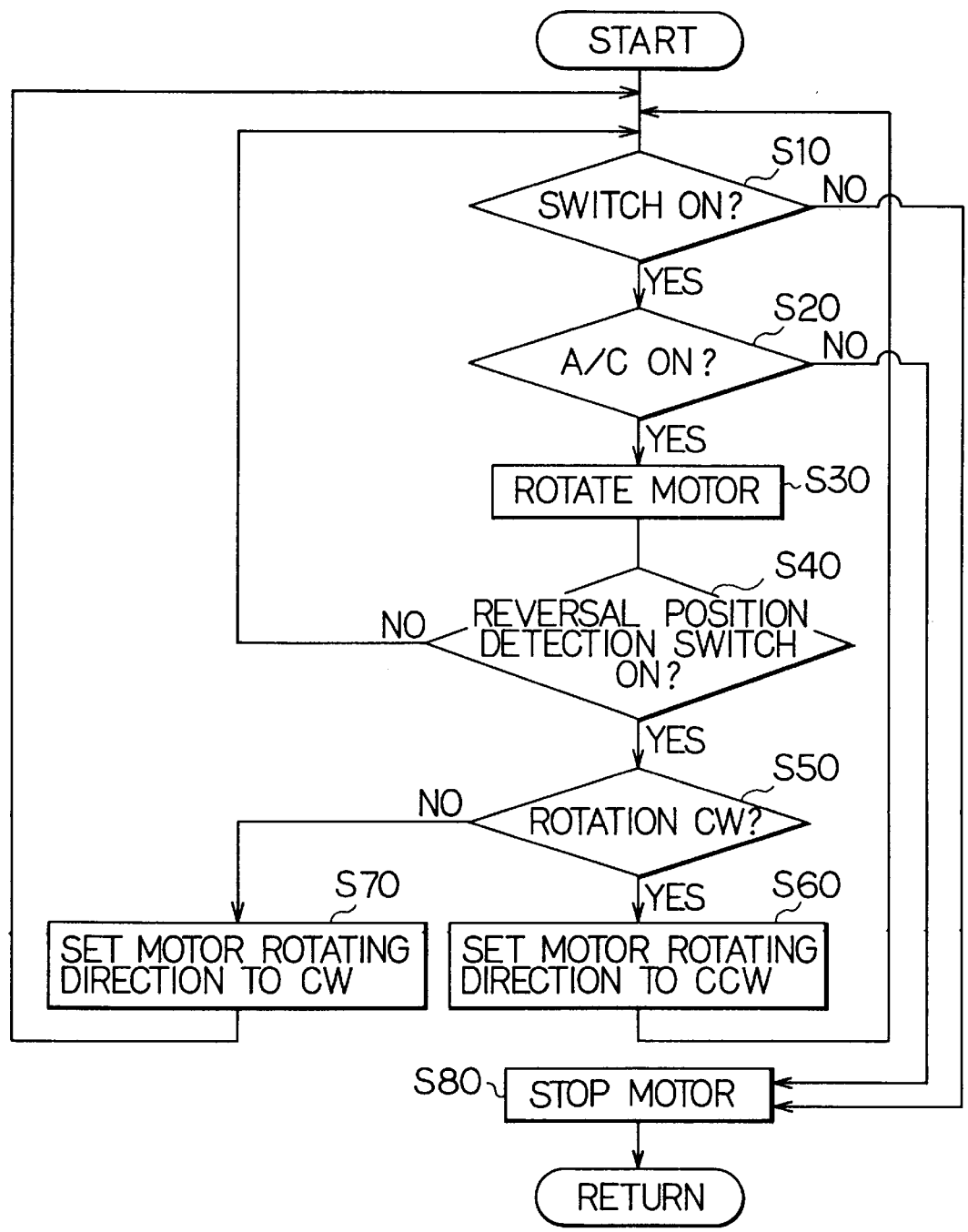
FIG. 9 is a flow chart showing a control program of the device for automatically changing air direction according to the first embodiment.

The flow chart shown in FIG. 9 shows the control program stored in the ROM (not shown) formed in the electric substrate 14a, and is performed when an ignition switch (not shown ) of the vehicle is turned on. In the first embodiment, the rotational direction of the rotor 12c (i.e., the rocking direction of the vertical fins 7) is beforehand set so that the ring rod 16 is moved to the right side when the step motor 12 changes from a stop state to a driving state.

Firstly, it is determined whether or not the rocking switch is set on at step S10. That is, it is determined whether or not the rocking switch 14b is set on by a passenger in the passenger compartment through the operation portion 22 and it is necessary to rock conditioned air.

When the determination is "YES", it proceeds to the process at step S20. When the determination is "NO", it proceeds to the process at step S80 to stop the step motor 12.

Next, it is determined whether or not the air conditioning switch (i.e., A/C switch) 200 is set on, that is, whether or not the air conditioning device for the vehicle is operated and the conditioned air is blown out from the air grills 3a and 3b at step S20. When conditioned air is not blown out from the air grills 3a and 3b, it is not necessary to rock the vertical fins 7. Therefore, it proceeds to the process at step 80.

At the step S20, when it is determined that conditioned air is blown out from the air grills 3a and 3b, it proceeds to the process at step 30, and the rotor 12c of the step motor 12 rotates in a beforehand set direction (hereinafter refereed to as "CW").

Next, it is determined whether or not a reversal position detection switch is set on at step S40. The reversal position detection switch includes the electric contacts 30 and 31. When the ring rod 16 shown in FIG. 6 moves to the left side, for example, the flow direction of conditioned air changes from the right side to the left side of the vehicle. When the flow direction of conditioned air changes to a predetermined direction, the electric contacts 30 and 31 formed in the ring rod 16 at the right side in FIG. 6 contact.

By contacting the electric contacts 30 and 31 at the right side, the flow direction (i.e., the direction of the vertical fins) of conditioned air changes from the vehicle left side to the vehicle right side. That is, when the electric contacts 30 and 31 contact at the right side, the ring rod 16 moves in the right side in FIG. 6. Further, when the ring rod 16 is moved at the right side, the electric contacts 30 and 31 placed at the left side in FIG. 6 contact, and the flow direction of conditioned air changes from the vehicle left side to the vehicle right side.

That is, when the electric contacts 30 and 31 placed at the right side in FIG. 6 contact, the ring rod 16 moves in the left side in FIG. 6. When the electric contacts 30 and 31 placed at the left side in FIG. 6 contact, the ring rod 16 moves in the right side in FIG. 6. That is, the electric contacts 30 and 31 reverse the rocking direction of the vertical fins 7.

Here, it is determined whether or not the electric contacts 30 and 31 are contacted to each other, at the step S40. When the determination is "YES", it proceeds to the process at step S50, and it is determined whether or not the rotational direction of the step motor 12 is in the CW. At the step S50, when the determination is "YES", it proceeds to the process at step S60, and set the rotational direction of the rotor 12c to the reverse direction CCW. Next, it returns to the process at the step S10.

At the step S50, when the determination is "NO", that is, the electric contacts 30 and 31 contact after rotating the rotational direction of the step motor 12 in the CCW, the rotational direction of the step motor 12 becomes to CW. Next, it returns to the process at the step S10.

Next, the functions of the connection clip portion 18 and the connection portion 17 will be described.

As described above, the vertical fins 7 are rocked by the step motor 12. In the first embodiment, the vertical fins 7 can be manually rotated by the operation lever 11.

When the connection clip portion 18 and the connection portion 17 are completely fixed to each other, the vertical fins 7 do not move even if the operation lever 11 is operated. Therefore, in the first embodiment, a friction clutch mechanism is formed between the arm portion 9 and the ring rod 16.

The friction clutch mechanism includes the connection clip portion 18 and the connection portion 17. Specifically, the connection portion 17 and the connection clip portion 18 are connected by elastic force and friction force. Here, the connection clip portion 18 rotates relative to the connection portion 17 only when an external force more than a predetermined value is applied to the connection clip portion 18.

Thus, when a force more than the predetermined value is applied to the fins by a passenger in the passenger compartment, the force transmitted from the step motor 12 to the vertical fins 7 is interrupted by the friction clutch mechanism so that the direction of the fins can be arbitrary changed.

That is, as shown in FIGS. 12A, 12B and 12C, when the operation lever 11 is operated by a passenger in the passenger compartment and an operation force (i.e., the external force) more than the predetermined value is applied to the connection clip portion 18, the connection clip portion 18 rotates relative to the connection portion 17 to interrupt the connection between the connection clip portion 18 and the connection portion 17. Thus, when an external force more than the predetermined value (e.g., 250 g, in the first embodiment) is applied to the operation lever 11, the direction of the vertical fins 7 can be arbitrary changed regardless of the operation of the step motor 12.

Because the operation force for arbitrary changing the direction of the vertical fins 7 is set by the elastic force and the friction force between the connection clip portion 18 and the connection portion 17, the operation force of the operation lever 11 can be readily set. Further, the connection portion 17 has the arcuate outer shape, the arcuate portion 18b is formed in the arcuate shape to engage with the connection portion 17 and inserts the connection portion 17 by the elastic force of the arcuate portions 18b.

When an operation force more than the predetermined value is applied to the operation lever 11 so that the direction of the vertical fins 7 is arbitrary changed, although the connection clip portion 18 rotates relative to the connection portion 17, the friction engaging state between the connection clip portion 18 and the connection portion 17 is hardly changed. Therefore, the operation force applied to the vertical fins 7 can be approximately maintained to a certain value.

According to the first embodiment, when the automatic rocking mechanism 4 is installed later, for example, because the arcuate portions 18b are connected to the connection portion 17, the clutch mechanism is readily attached to the arm portion 9 as compared with a case where the inserting portion 18d is attached to the arm portion 9, for example.

According to the first embodiment, the connection clip portion 18 is made of the spring steel. It is compared with resin material, a deformation of the connection clip portion 18 is decreased and the function of the clutch mechanism can be accurately performed in a long time.

Further, according to the first embodiment, because the step motor 12 is used as a driving source of the automatic rocking mechanism 4, the rocking speed and the rocking range of the vertical fins 7 can be readily set. Further, the rocking speed of the vertical fins 7 can be approximately maintained to a certain value, and uniform conditioned air can be blown out in a rocking range of the vertical fins 7.

A second preferred embodiment of the present invention will be described with reference to FIGS. 13 and 14. In the second embodiment, the parts identical to those in the first embodiment are shown with the same numerals, and the explanation thereof is omitted.

In the second embodiment, the screw shaft 20 does not move linearly. The mount portion 21 in the first embodiment does not show in FIGS. 13 and 14. Further, in the second embodiment, the step motor 12 rotates in a rotational output type operation method.

Figure 13:
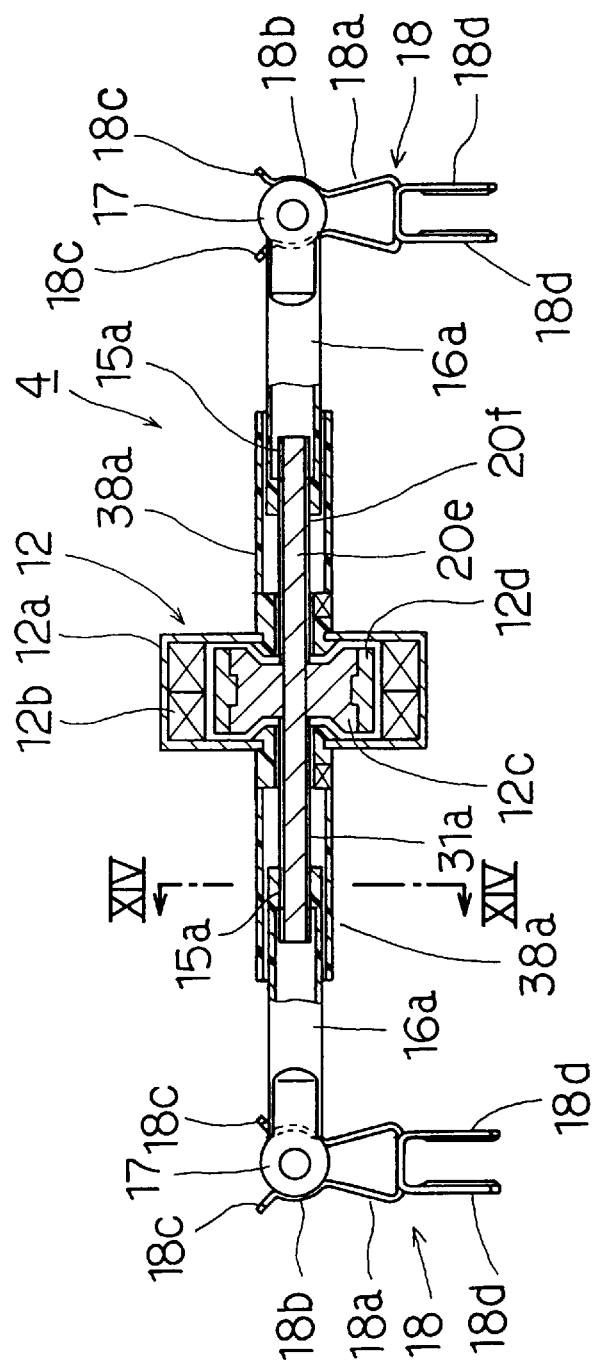
FIG. 13 is a partly sectional view of an automatic rocking mechanism according to a second preferred embodiment of the present invention.
Figure 14:
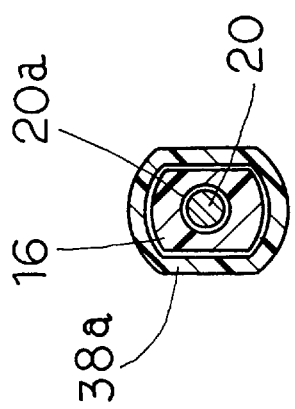
FIG. 14 is sectional view taken along line XIV—XIV in FIG. 13.

As shown in FIG. 13, a screw shaft 20e in the second embodiment is fixed to the rotor 12c at an axial position of the rotor 12c, and rotates integrally with the rotor 12c. A male screw portion 20f is formed on an outer peripheral surface of the screw shaft 20e, a female screw portion 15a to be screwed to the male screw portion 20f is formed in a ring rod 16a, and the ring rod 16 is screwed to the screw shaft 20e.

The ring rod 16a is screwed between the rotor guide 38a and the screw shaft 20e. As shown in FIG. 14, the ring rod 16a and the rotor guide 38 are formed in a deformed cylindrical shape having opposing flat surfaces so that a rotation of the rod 16a with the rotation of the rotor 12c can be prevented.

In the second embodiment, although the screw shaft 20e rotates integrally with the rotor 12c, the ring rod 16a is not rotated by the rotor guide 38a. As a result, when the rotor 12c rotates, the female screw portion 15a is moved by the male screw portion 20f so that the ring rod 16a and the connection clip portion 18 linearly reciprocate. In the second embodiment, because the rotor guide 38a is formed to cover the male screw portion 20f of the crew shaft 20e, an foreign object such as dust is not attached on the male screw portion 20f of the screw shaft 20e by the rotor guide 38a. Thus, in the second embodiment, effects similar to those in the first embodiment can be provided.

Although the present invention has been fully described in connection with preferred embodiments thereof with reference to the accompanying drawings, it is to be noted that various changes and modifications will become apparent to those skilled in the art.

For example, in the above-described embodiments, the axial direction of the rotor 12c corresponds to the rocking direction of the vertical fins 7. However, the axial direction of the rotor 12c may be perpendicular to the rocking direction of the vertical fins 7 so that the ring rod 16 and the connection clip portion 18 may linearly reciprocate.

In each of the above-described embodiments, the flow direction of conditioned air blown from the two air grilles 3a and 3b is automatically changed. However, only one air grill may be formed, and the flow direction of conditioned air blown from only one air grille may be automatically changed.

In each of the above-described embodiments, the vertical fins 7 are rocked in the vehicle width direction. However, the air grills 3a and 3b may be disposed in series in a vehicle front-rear direction so that the vertical fins 7 may be rocked in the vehicle front-rear direction.

In each of the above-described embodiments, the automatic rocking mechanism 4 is attached to the frame body 2 by the elastic force of the mount portion 21. However, the automatic rocking mechanism 4 may be attached to the frame body 2 by fastening means such as a vis.

In each of the above-described embodiments, the step motor is used as a driving source of the automatic rocking mechanism 4; however, an electric motor such as a reduction motor may be used.

Further, the mount portion 21 may be formed on the electric substrate 14a.

Further, the device 1 for automatically changing air-direction of the present invention may be applied to an air conditioning device for a home or the like.

In each of the above-described embodiments, the clutch mechanism is constructed by the connection portion 17 and the connection clip portion 18. However, the clutch mechanism may be constructed by the connection portion 18 and the arm portion 9. That is, the arm portion 9 may be inserted into the arcuate portion 18a of the connection clip portion 18 by an elastic force.

In each of the above-described embodiments, the arm portion 9 is formed to extend in a direction of plate surface of each vertical fin 7, and the inserting portion 18d inserts the arm portion 9 therein. However, the connection plate 8a or 8b may be directly inserted into the inserting portion 18d of the connection clip portion 18. In this case, the inserting portion 18d is disposed in the rocking direction of the vertical fins 7 to engage with the connection plate 8a or 8b.

In each of the above-described embodiments, the arm portion 9 is connected to the connection plates 8a and 8b. However, an engaging piece may be connected to any one of the vertical fins 7 and the engaging piece may be engaged with the inserting portion 18d without forming the arm portion 9. In this case, the inserting portion 18d has a shape similar to the arcuate portion 18b and the clutch mechanism may be constructed by the inserting portion 18d and the engaging piece.

Such changes and modifications are to be understood as being within the scope of the present invention as defined by the appended claims.

What is claimed is:

1. A device for automatically changing air direction, comprising:
    a plate for changing a flow direction of air;
    a step motor for rocking said plate, which has a rotor rotating with reference to an axis thereof and a stator disposed on an outer peripheral portion of said rotor, and controls a rotation of said rotor; and
    a transmission member which reciprocates linearly in an axial direction of said rotor by the rotation of said rotor to rock said plate in said axial direction of said rotor.

2. A device for automatically changing air direction according to claim 1, further comprising:
    a frame body for forming an air passage having an air outlet, wherein,
    said plate is provided in said air outlet,
    said step motor and said transmission member are integrally assembled, and
    said step motor and said transmission member assembled integrally are directly fitted to said frame body.

3. A device for automatically changing air direction according to claim 1, wherein,
    said transmission member includes:
    a clutch mechanism for interrupting a driving force transmitted from said step motor to said plate when an external force more than a predetermined value is applied to said plate; and
    a transmission rod connected to said step motor,
    said clutch mechanism is disposed between said plate and said transmission rod,
    said clutch mechanism includes a pressure portion connected to said transmission rod and an inserting portion connected to said plate, and said inserting portion is engaged to said plate to directly insert said plate therein.

4. A device for automatically changing air direction according to claim 1, wherein,
    said rotor includes a female screw portion formed around said axis of said rotor to penetrate through said rotor in said axial direction; and
    said transmission member includes a male screw portion formed on an outer peripheral portion thereof, wherein,
    said transmission member extends in said axial direction of said rotor,
    said male screw portion is screwed into said female screw portion, and
    said male screw portion moves to linearly reciprocate said transmission member when said female screw portion is rotated with the rotation of said rotor.

5. A device for automatically changing air direction according to claim 1, further comprising:
    a screw portion having a male screw portion formed on an outer peripheral surface thereof, which is fixed to said rotor, is rotated integrally with said rotor, and extends in said axial direction of said rotor, wherein,
    said transmission member includes a female screw portion engaged with said male screw portion, and
    said female screw portion is moved by said male screw portion to linearly reciprocate said transmission member when said rotor rotates.

6. A device for automatically changing air direction according to claim 4, further comprising:
    a cover portion for covering said male screw portion.

7. A device for automatically changing air direction according to claim 1, further comprising:
    a frame body having two air outlets formed proximately in series, wherein,
    said plate is provided in each of said two air outlets,
    said step motor is disposed in such a manner that said axial direction of said rotor corresponds to the series direction of said two air outlets,
    said transmission member is disposed at each of two end portions of said rotor in said axial direction, and
    said flow direction of air blown from said two air outlets is changed by rocking said plate when said rotor rotates and said transmission member linearly reciprocates.

8. A device for automatically changing air direction according to claim 7, wherein,
    said frame body has two partition plates which partition said two air outlets, and
    said step motor is disposed between said partition plates.

9. A device for automatically changing air direction, comprising:

a plate for changing flow direction of air;

a step motor for rocking said plate, which has a rotor rotating with reference to an axis thereof and a stator disposed on an outer peripheral portion of said rotor, and controls a rotational angle of said rotor; and a transmission member which reciprocates linearly in an axial direction of said rotor by the rotation of said rotor to rock said plate in said axial direction of said rotor, wherein said transmission member is disposed in such a manner that the linear reciprocating direction of said transmission member corresponds to a rocking direction of said plate.

10. A device for automatically changing air direction according to claim 9, further comprising:

a frame body for forming an air passage having an air outlet, wherein, said plate is provided in said air outlet, said step motor and said transmission member are integrally assembled, and said step motor and said transmission member assembled integrally are directly fitted to said frame body.

11. A device for automatically changing air direction according to claim 9, wherein, said transmission member includes:

a clutch mechanism for interrupting a driving force transmitted from said step motor to said plate when an external force more than a predetermined value is applied to said plate; and a transmission rod connected to said step motor, said clutch mechanism is disposed between said plate and said transmission rod, said clutch mechanism includes a pressure portion connected to said transmission rod and an inserting portion connected to said plate, and said inserting portion is engaged to said plate to directly insert said plate therein.

12. A device for automatically changing air direction according to claim 9, further comprising:

said rotor includes a female screw portion formed around said axis of said rotor to penetrate through said rotor in said axial direction; and said transmission member includes a male screw portion formed on an outer peripheral portion thereof, wherein, said male screw portion is screwed into said female screw portion, and said male screw portion moves to linearly reciprocate said transmission member when said female screw portion is rotated with the rotation of said rotor.

13. A device for automatically changing air direction according to claim 9, further comprising:

a screw portion having a male screw portion formed on an outer peripheral surface thereof, which is fixed to said rotor, is rotated integrally with said rotor, and extends in said axial direction of said rotor, wherein, said transmission member includes a female screw portion engaged with said male screw portion, and said female screw portion is moved by said male screw portion to linearly reciprocate said transmission member when said rotor rotates.

14. A device for automatically changing air direction according to claim 9, further comprising:

a rotation-interrupting mechanism for interrupting a rotation of said transmission member with the rotation of said rotor.

15. A device for automatically changing air direction, for a vehicle having an instrument panel portion in a passenger compartment, said device comprising:

a frame body for forming two air passages having two air outlets formed proximately in series in the vehicle width direction of said passenger compartment;

a plate provided in each of said air outlets, for changing a flow direction of air blown from said two air outlets to said passenger compartment;

a step motor for rocking said plate, which has a rotor rotating with reference to an axis thereof and a stator disposed on an outer peripheral portion of said rotor, and controls a rotation of said rotor; and a transmission member which reciprocates linearly in an axial direction of said rotor by the rotation of said rotor to rock said plate in said axial direction of said rotor, wherein, said two air outlets are formed in series at a center portion of said instrument panel portion in the vehicle width direction, said transmission member is disposed at each of two end portions of said rotor in said axial direction, and said flow direction of air blown from said two air outlets is changed by rocking said plate when said rotor rotates and said transmission member linearly reciprocates.

16. A device for automatically changing air direction, comprising:

a plate for changing a flow direction of air;

a step motor for rocking said plate, which has a rotor rotating with reference to an axis thereof and a stator disposed on an outer peripheral portion of said rotor, and controls a rotation of said rotor; and a transmission member which reciprocates linearly in an axial direction of said rotor by the rotation of said rotor to rock said plate.

17. A device for automatically changing air direction according to claim 16, further comprising:

a frame body for forming an air passage having an air outlet, wherein, said plate is provided in said air outlet, said step motor and said transmission member are integrally assembled, and said step motor and said transmission member assembled integrally are directly fitted to said frame body.

18. A device for automatically changing air direction according to claim 16, wherein, said transmission member includes:

a clutch mechanism for interrupting the driving force transmitted from said step motor to said plate when an external force more than a predetermined value is applied to said plate; and a transmission rod connected to said step motor, said clutch mechanism is disposed between said plate and said transmission rod, said clutch mechanism includes a pressure portion connected to said transmission rod and an inserting portion connected to said plate, and said inserting portion is engaged to said plate to directly insert said plate therein.

19. A device for automatically changing air direction, comprising:

a frame body for forming an air passage having an air outlet;

a plate provided in said air outlet and fixed to said frame body, for changing a flow direction of air blown from said air outlet; and a drive-controlling mechanism, wherein, said drive-controlling mechanism includes:

an electric motor for rocking said plate, said electric motor including a rotor rotating with respect to an axis thereof and a stator disposed on an outer peripheral portion of said rotor;

a control portion for electrically controlling said electric motor; and a transmission member connected to said plate for transmitting a driving force of said electric motor to said plate, said transmission member reciprocating linearly in an axial direction of said rotor, said transmission member being disposed in such a manner that the linear reciprocating direction of said transmission member corresponds to the rocking direction of said plate, said electric motor, said control portion and said transmission member are integrally assembled, and said electric motor, said control portion and said transmission member assembled integrally are directly fitted to said frame body.

20. A device for automatically changing air direction according to claim 19, wherein said plate includes a plurality of plate members.

21. A device for automatically changing air direction according to claim 20, further comprising:

a connection plate for connecting said plate members to integrally rock said plate members; and an arm portion connected to said connection plate, wherein said arm portion is connected to said transmission member.

22. A device for automatically changing air direction according to claim 19, wherein said transmission member includes a friction clutch mechanism for interrupting the connection between said transmission member and said plate when an external force more than a predetermined value is applied to said plate.

23. A device for automatically changing air direction according to claim 19, wherein, said air outlet includes two air outlet portions formed proximately in series, said plate is provided in each of said two air outlet portions, said electric motor is disposed in such a manner that said axial direction of said rotor corresponds to the series direction of said two air outlet portions, said transmission member is disposed at each of two end portions of said rotor in said axial direction, and said plate is rocked to change said flow direction of air blown from said two air outlet portion when said rotor rotates and said transmission member linearly reciprocates.

24. A device for automatically changing air direction according to claim 23, wherein, said frame body has two partition plates which partition said two air outlet portions, and said electric motor is disposed between said two partition plates.

25. A device for automatically changing air direction according to claim 24, wherein said drive-controlling mechanism is directly fitted to said frame body in such a manner that said electric motor is inserted between said two partition plates.

26. A device for automatically changing air direction according to claim 19, further comprising:

a mount portion made of an elastic material, wherein, said mount portion is fitted on said electric motor, and said drive-controlling mechanism is fitted to said frame body by elastically deforming said mount portion through said mount portion.

27. A device for automatically changing air direction according to claim 19, further comprising:

a mount portion made of an elastic material, wherein, said mount portion is fitted on said control portion, and said drive-controlling mechanism is fitted to said frame body by elastically deforming said mount portion through said mount portion.

28. A device for automatically changing air direction according to claim 19, wherein said electric motor is constructed by a step motor which controls the rotation of said rotor as said control portion.

* * * * *